Figure 2:
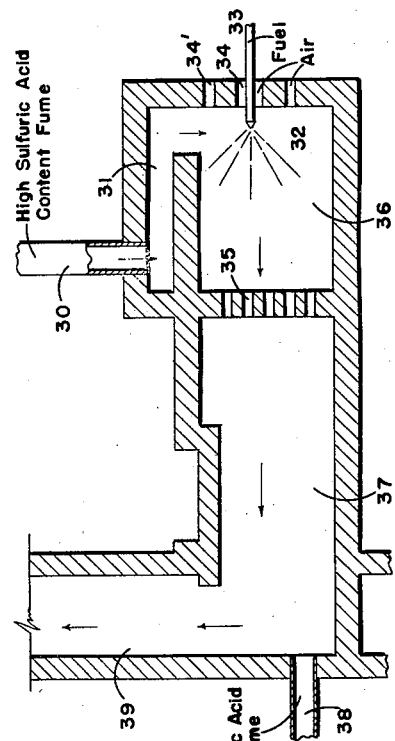

Sept. 12, 1950

J. L. WALKER 2,522,475

METHOD OF DISPOSING OF FUMES
CONTAINING SULFURIC ACID

Filed March 22, 1946

James L. Walker — INVENTOR.

BY

J S McKean

ATTORNEY.

Patented Sept. 12, 1950

2,522,475

UNITED STATES PATENT OFFICE 2,522,475

METHOD OF DISPOSING OF FUMES CONTAINING SULFURIC ACID

James L. Walker, Baytown, Tex., assignor to Standard Oil Development Company, a corporation of Delaware Application March 22, 1946, Serial No. 656,479

3 Claims. (Cl. 183—6)

The present invention is directed to a method of disposing of fumes containing sulfuric acid.

In sulfuric manufacturing and recovery plants, it frequently happens that fumes containing sulfuric acid are produced in the process. For example, sulfuric acid may be employed in certain refining operations and it is desirable to reconcentrate the dilute sulfuric acid which can be recovered from the spent acid obtained in such operations. Plants which concentrate sulfuric acid by blowing hot air through the acid to evaporate water therefrom are inexpensive to build and operate and are generally satisfactory except for the production of a large amount of fume comprising $SO_2$ and sulfuric acid mist particles which is discharged into the atmosphere. If the sulfuric acid is used in a manufacturing operation such as the refining of petroleum products the recovered weak acid also contains organic components, and the fume produced in the step of concentrating the acid includes vile smelling organic components in addition to $SO_2$ and sulfuric acid particles. In such fumes, the gaseous $SO_2$ is dispersed readily, whereas, the sulfuric acid exists as a stable aerosol of droplets (30–60 per cent solution of acid in water) having particle diameters in the range of $1.1 \times 10^{-3}$ to $1.6 \times 10^{-4}$ cm. It is usual that the fume containing the droplets of sulfuric acid-water solution has the appearance of a fog which has a characteristic odor and may be observed at a substantial distance from the point where the fume is produced. Such an acid fog is extremely difficult to destroy; the scrubbing of such fogs and the use of electrical precipitators to destroy such fogs are generally considered ineffective.

It is an object of the present invention to treat a fume comprising sulfuric acid droplets to prevent the formation of a sulfuric acid fog when the fume is discharged into the atmosphere.

The present invention may be briefly described as involving the input of heat into a gaseous mixture comprising droplets of sulfuric acid-water solution under such conditions that the mixture is heated to a temperature no lower than 400° F. and with a heat input such that the heated effluent gases contain no less than approximately 500,000 B. t. u. per pound of sulfuric acid remaining in the effluent.

In the practice of the present invention, a gaseous mixture in which sulfuric acid-water solution is present in small droplets is subjected to combustion conditions and the resulting gases are then discharged through a suitable stack into the atmosphere. The gaseous mixture being processed may be sent directly from its point of production, such as an acid concentrator, directly to the combustion zone. As an alternative, the mixture originally produced may be passed through a preliminary step, such as a Cottrell precipitator, for removing a portion of the sulfuric acid content of the fume and the remaining mixture sent to the combustion zone. The air present in the combustion zone may be varied over a wide range, for example, substantially in excess of that required for producing complete combustion, and the admixture sent to the combustion zone or alternatively, only the minimum amount of air needed to obtain the desired heat input into the acid fumes may be present with the fume in the combustion zone.

In a manufacturing plant wherein several acid fumes of different sulfuric acid concentration are produced, it may be desirable to admix the fumes and pass the resultant admixture to the combustion zone. Under some circumstances, however, a plurality of acid fumes are produced in which a first fume has a relatively high concentration of sulfuric acid-water droplets and a second fume has a relatively low concentration of sulfuric acid-water droplets. In this case, it may be desirable to pass the first fume to a combustion zone, subsequently admix the products of combustion from this operation with the second fume, and pass the total mixture through a stack to the atmosphere. A sufficient amount of heat must be added to the first fume such that, after the products of combustion have been mixed with the second fume, the total heat content of the mixture is equivalent to at least 500,000 B. t. u. per pound of sulfuric acid contained in the products of combustion of the first fume and of sulfuric acid contained in the second fume. The resultant mixture formed should have a temperature of at least 400° F. in order to cause a satisfactory disposal of the disagreeable components.

Figure 1:
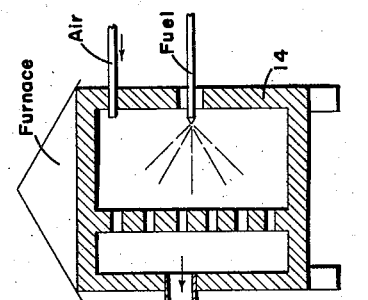
Figure 1:
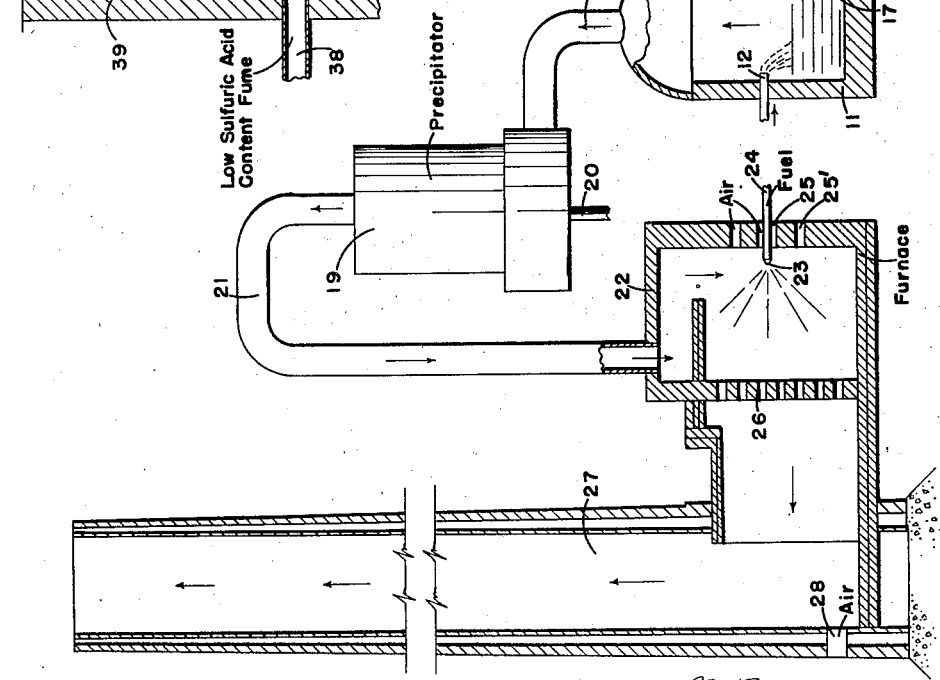

The invention will now be described in greater detail in conjunction with the drawing, in which:

Fig. 1 is an elevation, partly in section, illustrating an arrangement suitable for use in the practice of the present invention, and Fig. 2 is a fragmentary view, partly in section, of an elevation of a second arrangement suitable for use in the practice of the present invention.

Turning now specifically to the drawing and first to Fig. 1, a sulfuric acid concentrator is shown comprising a tower 11 having inlet means 12 for introducing spent sulfuric acid thereto.

A furnace 14 is arranged for producing hot combustion gases which are passed via passage 15 and inlets 16 into a pool of acid 17 maintained in the vessel 11. By way of example, it may be stated that acid discharged through inlet 12 may be a mixture of spent acid withdrawn from a process for treating lubricating oil with sulfuric acid and spent alkylation acid. Fumes comprising $SO_2$ and sulfuric acid-water solution in the form of finely dispersed droplets are produced in vessel 11 and are removed as overhead through an outlet for flue 18. In order to recover as much of the sulfuric acid as possible from the fumes they are charged into a Cottrell precipitator 19 where a portion of the sulfuric acid-water droplets is precipitated and removed as liquid through outlet 20. The remaining components of the fume are passed from Cottrell precipitator 19 through line 21 and are discharged into a furnace 22. The interior of the furnace is maintained at a suitably high temperature by combustion. In the furnace a burner 23 is shown which is supplied with a fuel, such as methane, through inlet line 24 and air to aid the combustion through opening 25 around the burner and through additional openings 25'. The furnace is provided with an arch or checkerwork wall 26. The products of the combustion discharge from the furnace into a stack 27 and pass up the stack. The products of combustion are discharged from the upper end of the stack into the atmosphere. If desired, additional air may be added to the products of the combustion through an opening 28 at the base of the stack.

Turning now to Fig. 2, a second arrangement is illustrated wherein fumes of different acid content are obtained in a manufacturing plant. Such fumes may result from different unit operations or a gaseous mixture containing minute drops of a mixture of sulfuric acid and water may be divided and a portion of the mixture may be passed through a Cottrell precipitator; in such an operation two separate fumes are obtained, one having a substantially higher sulfuric acid content than the other.

In Fig. 2 a fume with a relatively high sulfuric acid content is discharged through inlet 30 into a furnace 31. A burner 32 is arranged in the furnace and is supplied with suitable fuel, such as methane, via inlet 33. Air for combustion is provided by means of opening 34 around the burner and through additional openings 34'. A checkerwork or bridge 35 is provided in the furnace to define a hot combustion zone 36. The hot gases pass from the hot combustion zone to a cooler zone 37 where they are admixed with a fume of relatively low acid content which is introduced into the furnace through inlet 38 and the resultant mixture then flows into stack 39 and passes upwardly therein and is discharged to the atmosphere from the upper end of the stack.

Within the hot combustion zone 36 sufficient heat is liberated to provide a minimum of approximately 500,000 B. t. u. per pound of the total amount of sulfuric acid discharged to the atmosphere. Further, the conditions are maintained in the furnace such that the mixture resulting when the fume of relatively low acid content is mixed with the products of the combustion in portion 37 of the furnace has a temperature no lower than 400° F.; such a temperature insures the removal of the disagreeable smelling components from the fume, as well as the destruction of the acid fog.

From the above description it will be seen that the invention of the present application involves the treatment of gaseous mixtures including droplets of sulfuric acid-water solution whereby the mixture is heated to a temperature no less than 400° F. with a heat input of no less than approximately 500,000 B. t. u. per pound of sulfuric acid present in the hot effluent gas. Such conditions insure that when the product of combustion is discharged to the atmosphere and admixed therewith, the mixture is free from visible acid fog and substantially free from disagreeable odors. It is not understood why such a treatment destroys the sulfuric acid fog which ordinarily results from the handling of such acid fumes; as a hypothesis, it is suggested that such a treatment results in the reduction of sulfuric acid content and dispersion of the residual sulfuric acid to an invisible state by the following mechanism. When the hot effluent leaves the stack, it is immediately mixed with outside air; the concentration of the effluent gas in the gas-air mixture decreasing rapidly with increasing distance from the stack. As the stack gas, which contains the residual sulfuric acid leaving the furnace and is at a temperature which corresponds to a minimum heat content above atmospheric temperature of 500,000 B. t. u. per pound of sulfuric acid, is diluted with cold air, the temperature of the mixture and the concentration of sulfuric acid are both reduced. At any given acid concentration (and for a given water vapor concentration), there is a minimum temperature, called the dew point, at which the acid can be maintained in the vapor state. When the effluent gas has been diluted with air to such an extent that the temperature of the mixture is reduced to the dew point of the same mixture, liquid particles will condense. I have found that if the heat content of the effluent gas is sufficient to insure that the acid concentration of the gas-air, expressed on the basis of $SO_3$ content, is 1.7 milligrams $SO_3$ per cubic foot of dry gas-air mixture or below, when the mixture temperature reaches the mixture dew point, then no visible fog will be formed. It is to be understood that this explanation is a hypothesis only and is not intended in any way to limit the present invention.

It has been found that a heat input of approximately 500,000 B. t. u. per pound of sulfuric acid is required to maintain the mixture temperature above the dew point until the necessary dilution with atmospheric air has been obtained. The temperature of combustion required for this critical heat input depends on the concentration of acid in the fume, but it has been found that a temperature of at least approximately 400° F. is required in order to insure complete vaporization of all of the sulfuric acid in the fumes of relatively low sulfuric acid content. For fumes containing relatively large concentrations of sulfuric acid, it is to be understood that furnace temperatures as high as 1800° F. or higher may be required to supply the necessary amount of heat for the production of an invisible stack effluent.

Having fully described and illustrated the practice of the present invention, what I desire to claim as new and useful and to secure by Letters Patent is:

1. A method for treating fume containing droplets of sulfuric acid-water solution including the steps of adding heat thereto to increase the temperature of the heated gases to at least 400°

F. and with the addition of approximately 500,000 B. t. u. per pound of sulfuric acid in the heated gases, and subsequently discharging the heated gases to the atmosphere to form a gas-air mixture having an acid content expressed on the basis of $SO_3$ of 1.7 milligrams $SO_3$ per cubic foot of dry gas-air mixture when said gas-air mixture reaches its dew point.

2. A method for disposing of fumes comprising $H_2SO_4$, $SO_2$, and organic matter comprising the steps of subjecting the fumes to combustion conditions and adding heat in an amount such that the heat content of the products of combustion is equivalent to approximately 500,000 B. t. u. per pound of sulfuric acid contained therein and discharging said products of combustion to the atmosphere to form a gas-air mixture having an acid content expressed on the basis of $SO_3$ of 1.7 milligrams $SO_3$ per cubic foot of dry gas-air mixture when said gas-air mixture reaches its dew point.

3. A method of disposing of a plurality of fumes wherein a first fume comprising a relatively high concentration of sulfuric acid and a second fume comprising a relatively low concentration of sulfuric acid are disposed of, comprising the steps of subjecting the first fume to combustion conditions and admixing the products of combustion with the second fume to obtain a mixture having a temperature of no less than 400° F., the amount of heat added to the first of said fumes being equivalent to approximately 500,000 B. t. u. per pound of sulfuric acid present in said mixture and discharging the mixture into the atmosphere to form a gas-air mixture having an acid content expressed on the basis of $SO_3$ of 1.7 milligrams $SO_3$ per cubic foot of dry gas-air mixture when said gas-air mixture reaches its dew point.

JAMES L. WALKER.

REFERENCES CITED

The following references are of record in the file of this patent:

UNITED STATES PATENTS

| Number | Name | Date |
| --- | --- | --- |
| 1,432,582 | Will | Oct. 17, 1922 |
| 1,612,915 | Goggin | Jan. 4, 1927 |
| 2,426,822 | Fonas | Sept. 2, 1947 |

FOREIGN PATENTS

| Number | Country | Date |
| --- | --- | --- |
| 525,702 | Great Britain | Sept. 3, 1940 |